US012154056B2

(12) United States Patent
Sewak et al.

(10) Patent No.: US 12,154,056 B2
(45) Date of Patent: Nov. 26, 2024

(54) NESTED MODEL STRUCTURES FOR THE PERFORMANCE OF COMPLEX TASKS

(71) Applicant: MICROSOFT TECHNOLOGY LICENSING, LLC, Redmond, WA (US)

(72) Inventors: Mohit Sewak, Maharashtra (IN); Ravi Kiran Reddy Poluri, Samammish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 17/709,157

(22) Filed: Mar. 30, 2022

(65) Prior Publication Data

US 2023/0316196 A1    Oct. 5, 2023

(51) Int. Cl.
  *G06F 40/20*    (2020.01)
  *G06F 16/28*    (2019.01)
  *G06Q 10/0637*  (2023.01)

(52) U.S. Cl.
  CPC ....... *G06Q 10/0637* (2013.01); *G06F 16/285* (2019.01); *G06F 40/20* (2020.01)

(58) Field of Classification Search
  CPC ...................................................... G06F 40/20
  USPC ........................................................ 726/26
  See application file for complete search history.

(56) References Cited

U.S. PATENT DOCUMENTS

| | | | | |
|---|---|---|---|---|
| 8,887,286 | B2 * | 11/2014 | Dupont ................... | G06F 21/50 |
| | | | | 726/25 |
| 11,568,136 | B2 * | 1/2023 | Poirel ................... | G06F 40/237 |
| 11,875,118 | B2 * | 1/2024 | Galitsky ................. | G06F 40/30 |
| 2016/0335344 | A1 * | 11/2016 | Sutton ..................... | G06F 16/00 |
| 2020/0334448 | A1 * | 10/2020 | Ghazaryan ............ | G06V 10/82 |
| 2022/0038332 | A1 * | 2/2022 | Umakanth .......... | H04L 41/5009 |
| 2023/0214707 | A1 * | 7/2023 | Sewak .................. | G06F 16/285 |
| | | | | 706/12 |

OTHER PUBLICATIONS

U.S. Appl. No. 17/566,898, filed Dec. 31, 2021.
"Application as Filed in Indian Patent Application No. 202141029147", Filed Date: Jun. 29, 2021, 121 Pages.
(Continued)

*Primary Examiner* — Badri Narayanan Champakesan
(74) *Attorney, Agent, or Firm* — Shook, Hardy & Bacon L.L.P.

(57) ABSTRACT

The disclosure is directed to systems, methods, and computer storage media, for, among other things, employing nested model structures to enforce compliance, within a computational system, to at least one policy. One method includes receiving a digital record that encodes content. A plurality of models (e.g., integrated models and/or model droplets) is employed to analyze the records. The plurality of models is configured and arranged within a nested structure of a hierarchy of models. Each of the plurality of models analyzes at least a portion of the record. Based on the nested structure, the hierarchy combines the analysis from each of the plurality of models to determine that the content violates a policy of a system. In response to determining that the content violates the policy, at least one mitigation (or intervention) action are performed. The at least one mitigation action may alter subsequent transmissions of the record.

20 Claims, 10 Drawing Sheets

(56) References Cited

OTHER PUBLICATIONS

"International Search Report and Written Opinion Issued in PCT Application No. PCT/US22/052197", Mailed Date: Apr. 14, 2023, 14 Pages.

"International Search Report and Written Opinion Issued in PCT Application No. PCT/US23/012964", Mailed Date: May 3, 2023, 11 Pages.

Zhang, et al., "A Cost-Sensitive Three-Way Combination Technique for Ensemble Learning in Sentiment Classification", In International Journal of Approximate Reasoning, vol. 105, Feb. 1, 2019, pp. 85-97.

Zhou, et al., "Sentiment Analysis with Automatically Constructed Lexicon and Three-Way Decision", In Proceedings of 9th International Conference on Rough Sets and Knowledge Technology, Oct. 24, 2014, pp. 777-788.

* cited by examiner

NESTED MODEL STRUCTURES FOR THE PERFORMANCE OF COMPLEX TASKS

BACKGROUND

Numerous industries, governmental agencies, and other parties are often tasked with ensuring that their processes, procedures, data-communications, and agents conform to at least one regulation, rule, standard, and/or heuristic that ensure compliance with best practices in the associated activity domain. The general act of ensuring such conformity-in-action is often referred to as compliance enforcement. Due to the sheer volume of content associated with transactions, communications, and other activities that must be monitored to ensure compliance, as well as increasing complexity, automated monitoring methods are often the only tractable solution for at least partially effective compliance enforcement. Such automated methods often rely on a classifier model, or a variant thereof. However, the conventional technologies using classifier models are prone to numerous deficiencies that inhibit the effectiveness of compliance enforcement in many applications.

SUMMARY

Various aspects of the technology described herein are generally directed to systems, methods, and computer storage media, for, among other things, employing a hierarchy of models to ensure the enforcement of at least one policy of a system (e.g., a computational and/or communication system). One embodiment includes receiving a digital record that encodes content. A plurality of models (e.g., integrated models and/or model droplets) may be employed to analyze the record. The plurality of models may be configured and arranged within a nested structure of a hierarchy of models. Each of the plurality of models may analyze at least a portion of the record. Based on the nested structure, the hierarchy may combine the analysis from each of the plurality of models to determine that the content violates a policy of a system. In response to determining that the content violates the policy, at least one mitigation (or intervention) action may be performed. The at least one mitigation action may alter subsequent transmissions of the record.

The plurality of models may include an integrated classifier model. The integrated classifier model may include a first classifier model based on a first lexicon, a second classifier model based on a second lexicon, and a third classifier model based on a third lexicon. The first lexicon may include a first plurality of strings. The first plurality of strings may be included in a first plurality of training records that are labeled as belonging to the positive class of the integrated classifier model. The second lexicon includes a second plurality of strings. The second plurality of strings may be included in a second plurality of training records that are labeled as belonging to a negative class of the integrated classifier model. The third lexicon may include a third plurality of strings. The third plurality of strings may be included in both the first plurality of training records and the second plurality of training records.

The embodiments provide various benefits over conventional approaches to ensure the enforcement of at least one policy of a computational and/or communication system. Due to the complexity of ensuring enforcement of a given policy, no single model is likely able to accurately classify records as violating (or not violating) the policy. Any given policy likely encompasses many domains, of which no single model is likely to model accurately or encompass fully. The various embodiments overcome such limitations of conventional approaches by combining and providing feedback between multiple models. Each model of the embodiments may be trained to address various aspects (or domains) of a given policy. The at least one domain of a given model may be separate from other domains of other models or at least partially overlap the domains of at least one other model.

Furthermore, the models are arranged in a hierarchy of model droplets, containers, and layers. The various models, containers, and layers of the embodiments are enabled to "talk" to one another via having outputs of some components tied to the inputs of other components. Furthermore, the embodiments enable feedback loops between the various components (model droplets, containers, layers, and hierarchies). As noted above, the models of the embodiments may be trained to have "overlapping" portions of their respective domains, such that the "overlapping" models provide a system of "checks and balances" between competing models. The "overlap" between two or models provides more accurate results than conventional models.

Additionally, the conventional approaches that employ conventional machine learning (ML) models are often non-transparent to a developer and the users of the models. Conventional ML models, especially those based on neural-network architectures, are frequently opaque in that the "logic" of their operations are not readily inferable based on the set of weights that comprise the model. In contrast, the logic behind the various embodiments is inferable by the arrangement of the hierarchy of models. Furthermore, conventional approaches often do not control for errors in classifications. As discussed throughout, the embodiments provide the benefit of employing various error detection (and correction) components. These error detection (and correction) components are enabled to detect (and correct) false-positive (FP) errors and false-negative (FN) errors. Importantly, the embodiments provide scalability as an enforcement task scales. Conventional approaches may not readily scale as the complexity of the task grows. In contrast, the embodiments provide scalability by enabling scaling of the nested structure of the hierarchy of models.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
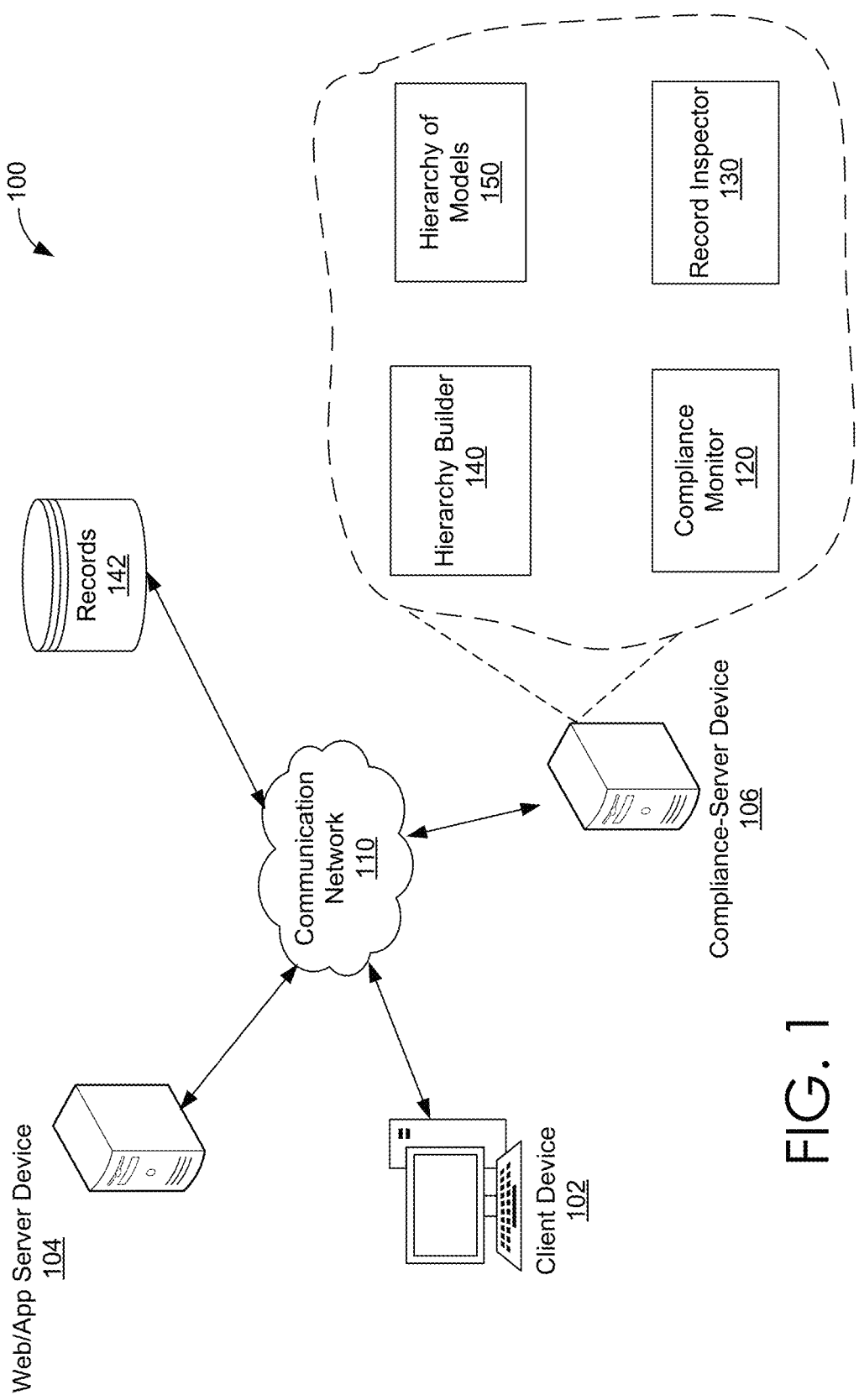
FIG. 1 illustrates an enhanced compliance system 100 implementing various embodiments presented herein.

The use of machine-learning (ML) models to automate tasks (e.g., compliance enforcement) has been proliferating for years. However, many ML models are trained to perform highly targeted tasks based on highly specific training data. Many tasks that are desired to be automated are generally more broad than any individual ML model. Furthermore, the individuals who are tasked to deploy ML models to automate tasks may not have expertise in the limits of the applicability of any single ML model to various domains (or sub-tasks) of the task to be automated. To address such concerns, the disclosure is directed towards a platform that enables integration of various ML models into a hierarchy of nested model structures. The hierarchy of models may be configured to automate a task. The hierarchy of nested models may be configured to address various balances between unified performance, scalability, and complexity management of the task to be automated. The concept of modularity and nesting is employed to configure and adapt a hierarchy of models to perform tasks of greater and greater complexity.

Various aspects of the technology described herein are generally directed to systems, methods, and computer storage media, for, among other things, generating a hierarchy of models, wherein the hierarchy of models is enabled to automate at least one task (e.g., compliance monitoring). Such models include, but are not limited to, machine learning models (e.g., classifier models, transformer models, and the like). Classifier models may include binary classifier models, such as, but not limited to, lexicon-based classifier models. Various models tend to be relatively narrow in scope and lack generality. A single model is unlikely to be enabled to perform a task of sufficient complexity. For instance, a compliance monitoring task may include flagging records (e.g., a document, an audio message, an email message, an instant message, a social-media post, or other communication messages/content) that include content that may be considered "offensive." The boundary between offensive and not-offensive is difficult to establish, and many separate domains must be considered when classifying a record as including offensive content or not including offensive content. That is, offensive content is a relatively broad term that encompasses many aspects, e.g., profanity, harassing language, threatening language, hate-speech, and the like. No single conventional classifier model is likely to be enabled to correctly classify records as offensive or not-offensive, while still controlling for false-positive and false-negative rates.

To such ends, the embodiments are directed towards providing a platform that enables a user to generate a hierarchy of models, where each of the models is targeted towards separate aspects of a task. That is, the hierarchy of models forms an "effective" model that is enabled to perform the task for which the hierarchy was designed. Once generated, the hierarchy of models (e.g., the effective model) may be deployed to automate a task of any complexity level. Although the various discussions throughout are directed towards classifying a record as including offensive content or not including offensive content, the tasks are not so limited. That is, the embodiments may be employed to generate a hierarchy of models that are targeted to any task of any complexity level.

The embodiments employ a nested-architecture of model structures, where each "level" in the nested-architecture may include at least one model structure. The levels may be envisioned as a "vertical stack" of nested model structures, somewhat analogous to a Matryoshka doll (i.e., a Russian nested doll). Each level of the vertical (or nested) stack may be associated with a specific model structure. The complexity of the vertically arranged model structures may increase in complexity as the level associated with the model structure is increased as the vertical stack is ascended. For instance, the bottom (or base) layer of the vertically stacked model structures may include discrete models, referred to as "model droplet" model structures. Model droplets may be "pooled" together to form an "integrated model." An integrated model may be containerized (e.g., embedded in a container). Thus, the level above the base level of the vertical stack (e.g., model droplets) may include "container" model structures. A container may include at least one integrated model and/or model droplets. In various embodiments, a container may include at least one container, e.g., a container including at least one integrated model or a "container of containers." Containers may be integrated into a "layer." Thus, the level above the container level of the vertical stack may include "layer" model structures. A layer may include at least one container, including at least one "container of container." Containers may be added or removed from a layer as model droplets are refined, updated, generated, decommissioned, or as otherwise needed. Accordingly, the layers may be "elastic layers." Layers may be arranged into a hierarchy of layers (e.g., a hierarchy of models). Thus, the top-level of the vertical stack may include a "hierarchical" model structure. A hierarchy of models may include at least one layer (e.g., elastic layers).

Each model droplet may be trained and targeted towards separate discrete modes of analyses. Although the various discussions are directed towards lexicon-based classifier model droplets, the embodiments are not so limited. A model droplet may include virtually any model (e.g., a machine learning model), such as, but not limited to, transformer models, support-vector machines, Markov decision processes, and the like. In various non-limiting embodiments, model droplets may include "pure positive" lexicon-based classifier models, "pure negative" lexicon-based classifier models, and "uncertain" (or "mixed") lexicon-based classifier models. Briefly, a pure-positive (PP) lexicon classifier model may be a classifier model that includes and/or is based on a lexicon of keywords/keyphrases that are found in "positive" examples of positively classified records (e.g., positively classified training records). A PP model droplet may receive, as input, a record. The PP model may output a "1" (or "P") to indicate that the PP model classifies the input record as positively classified or output a "0" (or "NP") to indicate that the PP model does not classify the input record as positively classified, as well as a probability (or confidence) of the classification. A pure-negative (PN) lexicon classifier model may be a classifier model that includes and/or is based on a lexicon of keywords/keyphrases that are found in "negative" examples of negatively classified records (e.g., negatively classified training records). A PN model droplet may receive, as input, a record. The PN model may output a "1" (or "N") to indicate that the PN model classifies the input record as negatively classified or output a "0" (or "NN") to indicate that the PN model does not classify the input record as negatively classified, as well as a probability (or confidence) of the classification. A uncertain (or mixed) lexicon classifier model may be a classifier model that includes and/or is based on a lexicon of keywords/keyphrases that are found in both "positive" and "negative" examples of classified records (e.g., classified training records). A mixed model droplet may receive, as input, a record. The mixed model may output a "1" (or "M") to indicate that the mixed model classifies the input record as mixed-classified or output a "0" (or "NM") to indicate that the mixed model does not classify the input record as mixed-classified, as well as a probability (or confidence) of the classification.

Various model droplets may be integrated to form an integrated model. Some integrated models may be comprised of only a PP model, a PN model, or a mixed model. Some integrated models may be comprised of both a PP model and a PN model. Still other integrated models may include each of a PP model, a PN model, and a mixed model. An integrated model may combine the outputs of its constituent model droplets in various ways to generate an output that includes "1" for positively classified records, a "0" for negatively classified records, or a "M" for mixed-classified records, as well as a probability (or confidence) in the classification.

As indicated above, the integrated models and/or model droplets may be "containerized." A container model structure may include at least one integrated model and/or model droplets. The functionality and/or performance of a container may be tailored to at least one specific task. Some containers may be "classifier" containers that are directed towards classifying a record based on the integrated models and/or model droplets included in the container. These classifier containers may be optimized for such a classification task. Other containers may be specialized to analyze and detect potentially false categorizations. For example, some containers may be optimized to detect errors in the classification performed by a classification container (e.g., error-detection containers). Error-detection containers may come in at least two varieties: false-negative containers and false-positive containers). False-negative (FN) containers may be containers that are optimized to detect FN errors, while false-positive (FP) containers may be containers that are optimized to detect FP errors. The outputs of classification containers may be employed as inputs to error-detection containers. If the error-detection container detects that a classification is in error, the record may be classified as mixed (or uncertain). At least one classification container and at least one error-detection container may be containerized in a single container. The output of a single container model structure may include a first channel for positive classifications, a second channel for negative classifications, and a third channel for mixed (or uncertain classifications). Rather than separate channels, some container model structures may include a single channel with multiple possible out signals (e.g., a positive signal, a negative signal, or a mixed channel).

At least one container may be embedded in a layer (e.g., an elastic layer). Each container in a layer may be optimized for different levels of classification and/or classifying via separate classification types or categories. In the "offensive language" example discussed above, a first container in a layer may be optimized for classifying a record as including (or not including) profanity. A second container in the layer may be optimized for classifying a record as including (or not including) harassing language. A third container in the layer may be optimized for classifying a record as including (or not including) threatening language. A fourth container in the layer may be optimized for classifying a record as including (or not including) threatening hate-speech. At least one error-detection container may be included in the "offensive" content layer. Similar to container model structures, the output of a layer model structure may include a first channel for positive classifications, a second channel for negative classifications, and a third channel for mixed (or uncertain classifications). In addition, similar to containers, an elastic layer may include a single output channel with multiple output signal types.

Separate layers may be generated for separate droplet model types. For instance, some integrated models/containers may employ lexicon-based classifier droplets to analyze records at the level of keywords. Other integrated models/containers may employ lexicon-based classifier droplets to analyze records at the level of keyphrases and/or sentences. Still other integrated models/containers may employ transformer-based droplets to analyze records at the level of larger portions of content (e.g., at least one sentences, paragraphs, sections, chapters, or the like). In various non-limiting embodiments, a keyword layer, which includes at least one keyword-based container, may be generated. A keyphrase layer, which includes at least one keyphrase-based container, may be generated. A transformer layer, which includes at least one transformer-based container, may be generated.

Separate layers may be integrated to form a hierarchy of models. In a non-limiting embodiment directed towards the detection of offensive language, a hierarchy of models may include a keyword layer, a keyphrase model, and a transformer model. The various layers may form an "analysis chain" for analyzing a record. The layers may be combined in various ways to form feedback loops, recursive analyses, and/or iterative analyses to fully analyze a record. Similar to container/layer model structures, the output of a hierarchy model structure may include a first channel for positive classifications, a second channel for negative classifications, and a third channel for mixed (or uncertain classifications). In addition, similar to containers/layers, a hierarchy of models may include a single output channel with multiple output signal types.

A hierarchy of models may be deployed to monitor a stream (or pipeline) of records. Thus, a hierarchy of models may be employed to monitor a system (e.g., a computational and/or communication network system) for at least one compliance enforcement task. A pipeline of records may be provided to the hierarchy of models. For each record that is positively classified (e.g., positively classified as including offensive language), at least one intervention may be applied to the record. For example, the record may be quarantined (or sandboxed) within the system, a warning and/or notification may be affixed to the record, or the like.

The various embodiments provide a user interface (UI) to enable the generation of a specific hierarchy of models. For example, the UI may enable a user to define at least one integrated model from a pool of a set of model droplets. Each model droplet may be trained separately to be optimized for various tasks (e.g., classification tasks). The UI may enable the user to generate at least one container from a set of integrated models (generated by the user employing the UI). The UI may enable the user to generate at least one layer from a set of containers (generated by the user employing the UI). The UI may enable the user to generate at least one model hierarchy from a set of layers (generated by the user employing the UI).

The embodiments provide significant benefits over conventional methods of employing models (e.g., classifier models) to perform various tasks of sufficient complexity. As noted above, it is unlikely that any conventional model may be general enough to solve complex problems and/or tasks of sufficient complexity. As such, the embodiments enable the integration of multiple models to form integrated models, containers of models, containers of containers, layers of containers, and hierarchies of layers (e.g., a hierarchy of models). The ability to generate such nested model structures may enable the user to generate a hierarchy of models that is general enough to perform complex tasks. Furthermore, conventional machine learning models often lack visibility into how the model generates an answer (e.g., a classification). Because many conventional machine learning models are implemented via "deep learning"-style neural network architectures, the models lack visibility into the underlying "learned" logic that enables classification. The various embodiments provide visibility into the underlying logic that is employed to perform tasks of sufficient complexity. For instance, a logic of a container, a layer of containers, and a hierarchy of layers may be analyzed and/or visualized.

As noted above, multiple model droplets and/or integrated models may be employed to form the containers, layers, and hierarchies of models. Various "overlaps" between the models, containers, layers, and hierarchies may be formed. Such overlap in the model structures may be leveraged to ensure "completeness" over a complex task. Additionally, the employment of error-detection containers allows for the detection and correction of erroneous classifications. For example, FP classifications and FN classifications may be detected and corrected. Conventional models often lack such error-detection and correction features. Furthermore, within a hierarchy, the layers may be enabled to "talk" to one another. Thus, feedback loops, recursive analyses, and/or iterative analyses may be generated and leveraged within a hierarchy of models. The employment of conventional models may not enable such feedback-based analyses.

Environments for Enforcing Compliance Via Policies

FIG. 1 illustrates an enhanced compliance system 100 implementing various embodiments presented herein. Compliance system 100 is enabled to enforce compliance via at least one policy (e.g., rules or heuristics). Compliance system 100 enforces compliance by monitoring and analyzing (e.g., in real-time or in batch mode) records (e.g., records database 142). If it is determined that a detected record violates at least one policy of system 100, then at least one intervention may be performed (e.g., quarantine or sandbox the violating record).

Classifier system 100 may include at least a client computing device 102, web/application server device 104, a compliance-server device 106, a stream and/or database of records 142, and a communication network 110 that communicatively couples the components of system 100. A record (included in records 142) may include, but are not limited to communications (e.g., transmitted messages, files, applications, executables, documents, presentations, and the like) between the client device and web/app server device 104. A record may include a file stored on either client device 102 and/or web/app server device 104, or any other file or information stored in a digital format.

Compliance-server device 106 may implement a compliance monitor 120, a record inspector 130, and a hierarchy builder 140. Compliance monitor 120 is generally responsible for enforcing at least one policy. That is, compliance monitor 120 may ensure that both client device 102 and web/app server device 104, as well as any records generated by these devices, conform to the access policies. Compliance monitor 120 may perform at least one intervention in the event that a record included in records 142 is determined to violate at least one of the at least one policy. For example, if a record is found to violate a policy, compliance monitor 120 may perform at least one mitigation and/or intervention (e.g., quarantining and/or sandboxing the violating record). As discussed throughout, hierarchy builder 140 may provide a user interface (UI) that enables a user to build and/or generate model droplets, integrated models, containers, (elastic) layers, and hierarchies of models (e.g., hierarchy of models 150). Record inspector 130 may employ any of the hierarchies of models (e.g., hierarchy of models 150) generated via hierarchy builder 140. More specifically, record inspector 130 may employ hierarchy of models 150 to inspect each record (e.g., in real-time or in batch/offline mode) in records 142. Via the hierarchy of models 150, record inspector 130 is enabled to classify each record positively (e.g., the record violates at least one policy) or classify the record negatively (e.g., the record does not violate at least one policy). Compliance monitor 120 may employ record inspector 130 to classify each incoming record. If the record inspector 130 classifies a record as violating a policy (e.g., classifies the record as belonging to a classification that indicates a policy violation), then compliance monitor 120 may perform at least one intervention/mitigations.

Figure 5:
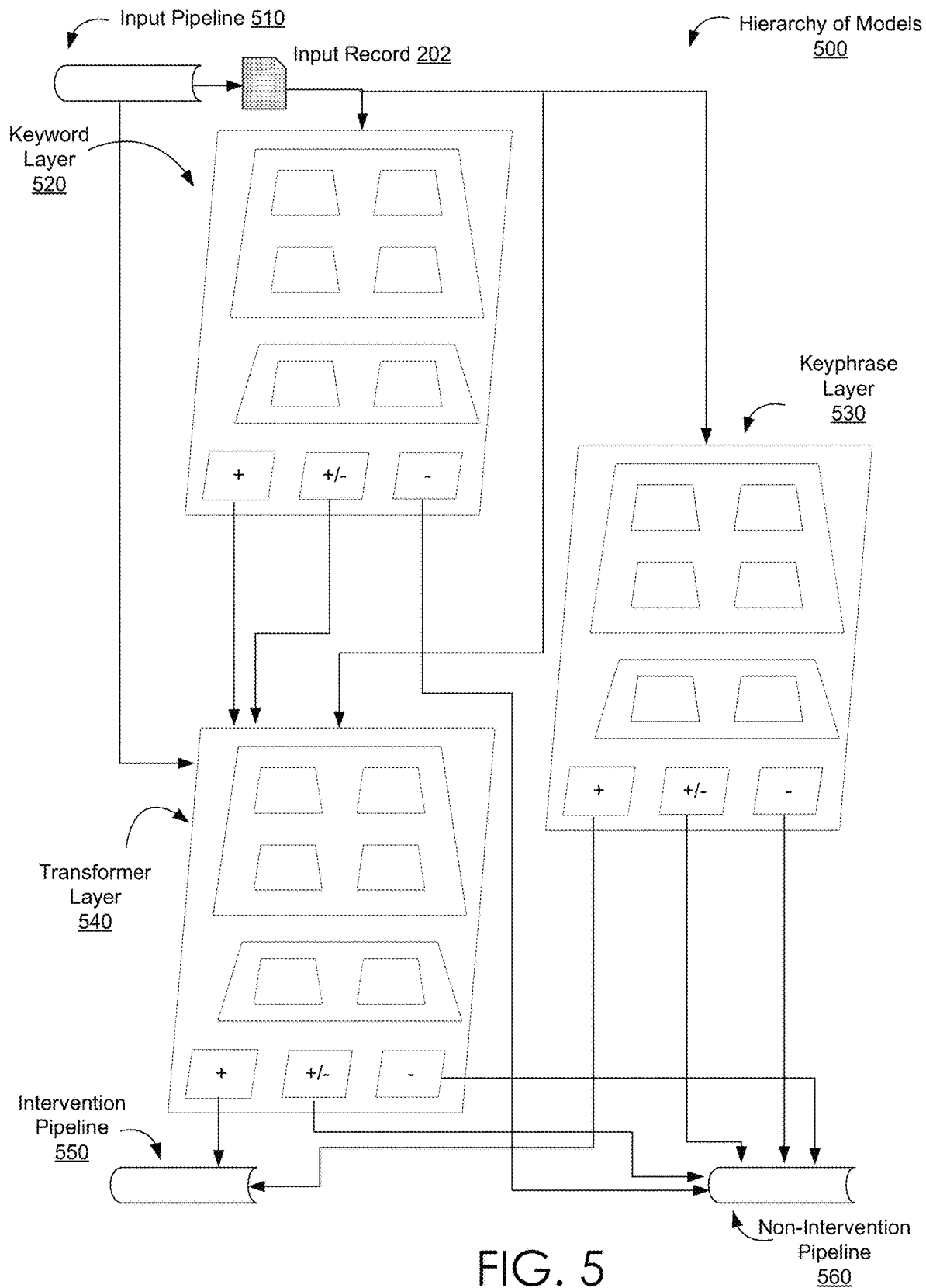
FIG. 5 illustrates a hierarchy of models that is consistent with the various embodiments.

In a non-limiting example, one such policy may be that a record not include "offensive" language, audio, video, and/or other content. Accordingly, hierarchy of models 150 may include a hierarchy of nested model droplets, model containers, and elastic layers that are configured and enabled (via implementation by record inspector 130) to classify each record of records 142 as including offensive content (e.g., positively classified) or as not including offensive content (e.g., negatively classified). As noted throughout, hierarchy of models 150 may include error-detection (and error-correction) containers/layers. Such error-detection model structures may detect (and optionally correct) false-positive (FP) classifications and/or false-negative (FN) classifications. A user may have employed hierarchy builder 140 to generate the hierarchy of models 150, such that the hierarchy of models 150 is enabled (via its implementation by record inspector 130) to detect offensive content within a record. A non-limiting example of a hierarchy of models is shown in FIG. 5. That is, hierarchy of models 150 may be similar to hierarchy of models 500 of FIG. 5. When the record inspector 130 classifies a record as including offensive content, compliance monitor 120 may perform at least one intervention and/or mitigations associated with the offending record.

Communication network 110 may be a general or specific communication network and may be directly and/or indirectly communicatively coupled to client computing device 102 and web/app server device 104. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way that computing devices are enabled to exchange information via communication network 110.

Nested Model Structures

Figure 2A:
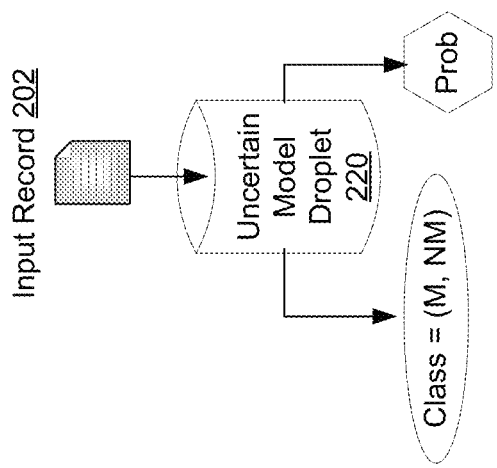
FIG. 2A illustrates various model droplets that are consistent with the various embodiments.
Figure 2A:
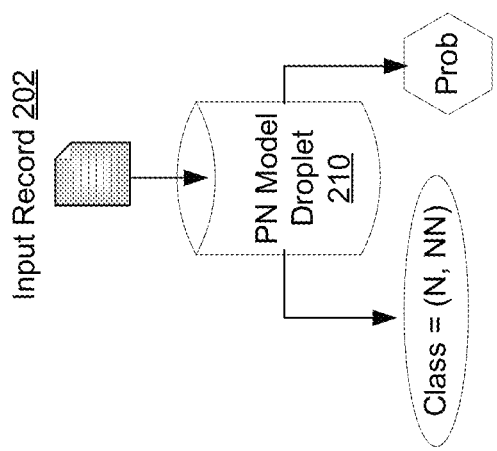
Figure 2A:
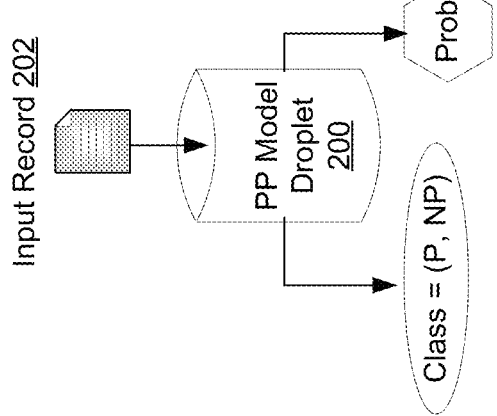

FIG. 2A illustrates various model droplets that are consistent with the various embodiments. More specifically, FIG. 2A illustrates a "pure-positive" (PP) lexicon-based classifier model droplet 200, a "pure-negative" (PN) lexicon-based classifier model droplet 210, and an "uncertain" (or "mixed") lexicon-based classifier model 220. As noted throughout, a model droplet may be a model structure that is the base (or atomic) structure of the various nested model structures included in the various embodiments. Although the model droplet structures discussed herein are based on lexicon-based classifier models, the embodiments are not so limited. Model droplets may be based on other model types, such as, but not limited to, non-lexicon-based classifier models, transformer models, or the like. In addition, the nested model structures discussed herein are directed towards the detection and/or classification of "offensive content." The embodiments are not so limited, and the nested model structures may be directed towards detecting and/or classifying other types of content.

The PP model droplet 200 may include a classifier model that includes and/or is based on a lexicon of keywords/keyphrases that are found in "positive" examples of positively classified records (e.g., positively classified training records). The PP model droplet 200 may receive, as input, an input record 202. The PP model droplet 200 may output a "1" (or "P") to indicate that the PP model droplet 200 classifies the input record 202 as positively classified or output a "0" (or "NP") to indicate that the PP model droplet 200 does not classify the input record 202 as positively classified, as well as a probability (prop) of the classification. The PN model droplet 210 may include a classifier model that includes and/or is based on a lexicon of keywords/keyphrases that are found in "negative" examples of negatively classified records (e.g., negatively classified training records). The PN model droplet 210 may receive, as input, the input record 202. The PN model droplet 210 may output a "1" (or "N") to indicate that the PN model droplet 210 classifies the input record as negatively classified or output a "0" (or "NN") to indicate that the PN model droplet 210 does not classify the input record as negatively classified, as well as a probability (prob) of the classification. The uncertain (or mixed) model droplet 220 may include a classifier model that is based on a lexicon of keywords/keyphrases that are found in both "positive" and "negative" examples of classified records (e.g., classified training records). The mixed model droplet 220 may receive, as input, the input record 202. The mixed model droplet 220 may output a "1" (or "M") to indicate that the mixed model droplet 220 classifies the input record 202 as mixed-classified or output a "0" (or "NM") to indicate that the mixed model droplet 220 does not classify the input record 202 as mixed-classified, as well as a probability (or confidence) of the classification.

Various model droplets may be integrated to form an integrated model. Some integrated models may be comprised of only the PP model droplet 200, the PN model droplet 210, or the mixed model droplet 220. Some integrated models may be comprised of both the PP model droplet 200 and the PN model droplet 210. Still other integrated models may include each of the PP model droplet 200, the PN model droplet 210, and the mixed model droplet 220. An integrated model may combine the outputs of its constituent model droplets in various ways to generate an output that includes "1" for positively classified records, a "0" for negatively classified records, or an "M" for mixed-classified records, as well as a probability (or confidence) in the classification.

Figure 2B:
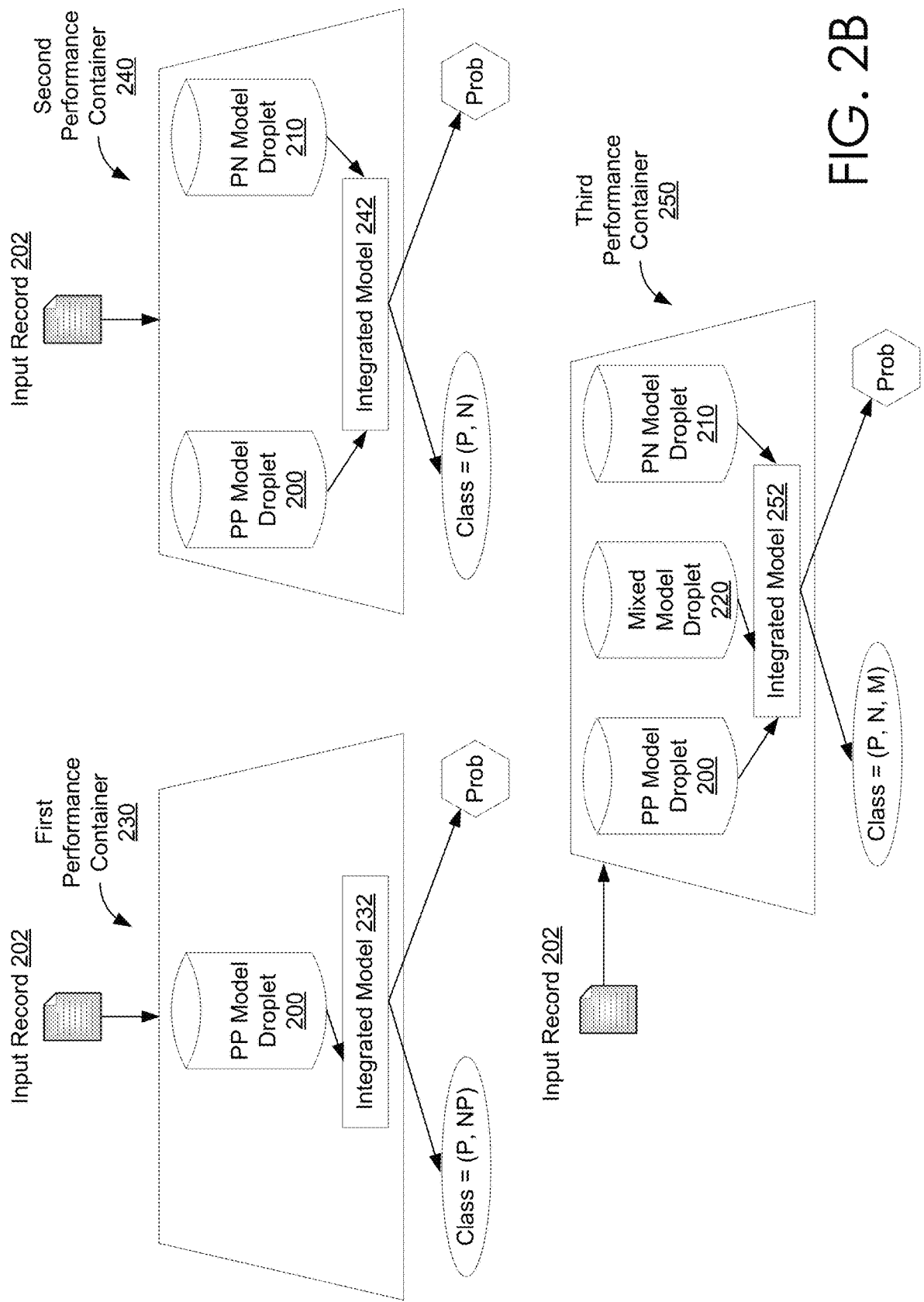
FIG. 2B illustrates various container model structures that are consistent with the various embodiments.

As indicated above, the integrated models and/or model droplets may be "containerized." FIG. 2B illustrates various container model structures that are consistent with the various embodiments. A container model structure may include at least one integrated model and/or model droplets. The functionality and/or performance of a container may be tailored to at least one specific task, and thus a container may be a performance container. Some performance containers may be "classifier" containers that are directed towards classifying a record based on the integrated models and/or model droplets included in the container. These classifier containers may be optimized for such a classification task. More specifically, FIG. 2B shows a first performance container 230, a second performance container 240, and a third performance container 250.

First performance container 230 includes a first integrated model 232 that is comprised of the PP model droplet 200. First performance container 230 (and first integrated model 232) receives, as input, the input record 202. First performance container 230 (and first integrated model 232) outputs a classification or class (e.g., "P" or "CP" to indicate a positive classification or "NP" to indicate a not positive classification) and probability (prob) of the classification for the input record 202.

Second performance container 230 includes a second integrated model 242 that is comprised of the PP model droplet 200 and the PN model droplet 210. Second performance container 240 (and second integrated model 242) receives, as input, the input record 202. Second integrated model 242 combines the output of the PP model droplet 200 and the PN model droplet 210 to generate a classification output for the second performance container 240 (and the second integrated model 242). More specifically, second performance container 240 (and second integrated model 242) outputs a classification or class (e.g., "P" or "CP" to indicate a positive classification or "N" or "CN" to indicate a negative classification) and probability (prob) of the classification for the input record 202.

Third performance container 250 includes a third integrated model 252 that is comprised of the PP model droplet 200, the PN model droplet 210, and the mixed (or uncertain) model droplet 220. Third performance container 250 (and third integrated model 252) receives, as input, the input record 202. Third integrated model 252 combines the output of the PP model droplet 200, the PN model droplet 210, and the mixed model droplet 220 to generate a classification output for the third performance container 250 (and the third integrated model 252). More specifically, third performance container 250 (and third integrated model 252) outputs a classification or class (e.g., "P" or "CP" to indicate a positive classification, an "N" or "CN" to indicate a negative classification, or an "M" or "CM" to indicated a classification of mixed (or uncertain)) and probability (prob) of the classification for the input record 202.

Other containers may be specialized to analyze and detect potentially false and/or erroneous categorizations. For example, some containers may be optimized to detect errors in the classification performed by a classification container (e.g., error-detection containers). Error-detection containers may come in at least two varieties: false-negative containers and false-positive containers). False-negative (FN) containers may be containers that are optimized to detect FN errors, while false-positive (FP) containers may be containers that are optimized to detect FP errors. The outputs of classification containers may be employed as inputs to error-detection containers. If the error-detection container detects that a classification is in error, the record may be classified as mixed (or uncertain). At least one classification container and at least one error-detection container may be containerized in a single container. The output of a single container model structure may include a first channel for positive classifications, a second channel for negative classifications, and a third channel for mixed (or uncertain classifications). Rather than separate channels, some container model structures may include a single channel with multiple possible out signals (e.g., a positive signal, a negative signal, or a mixed channel).

Figure 2C:
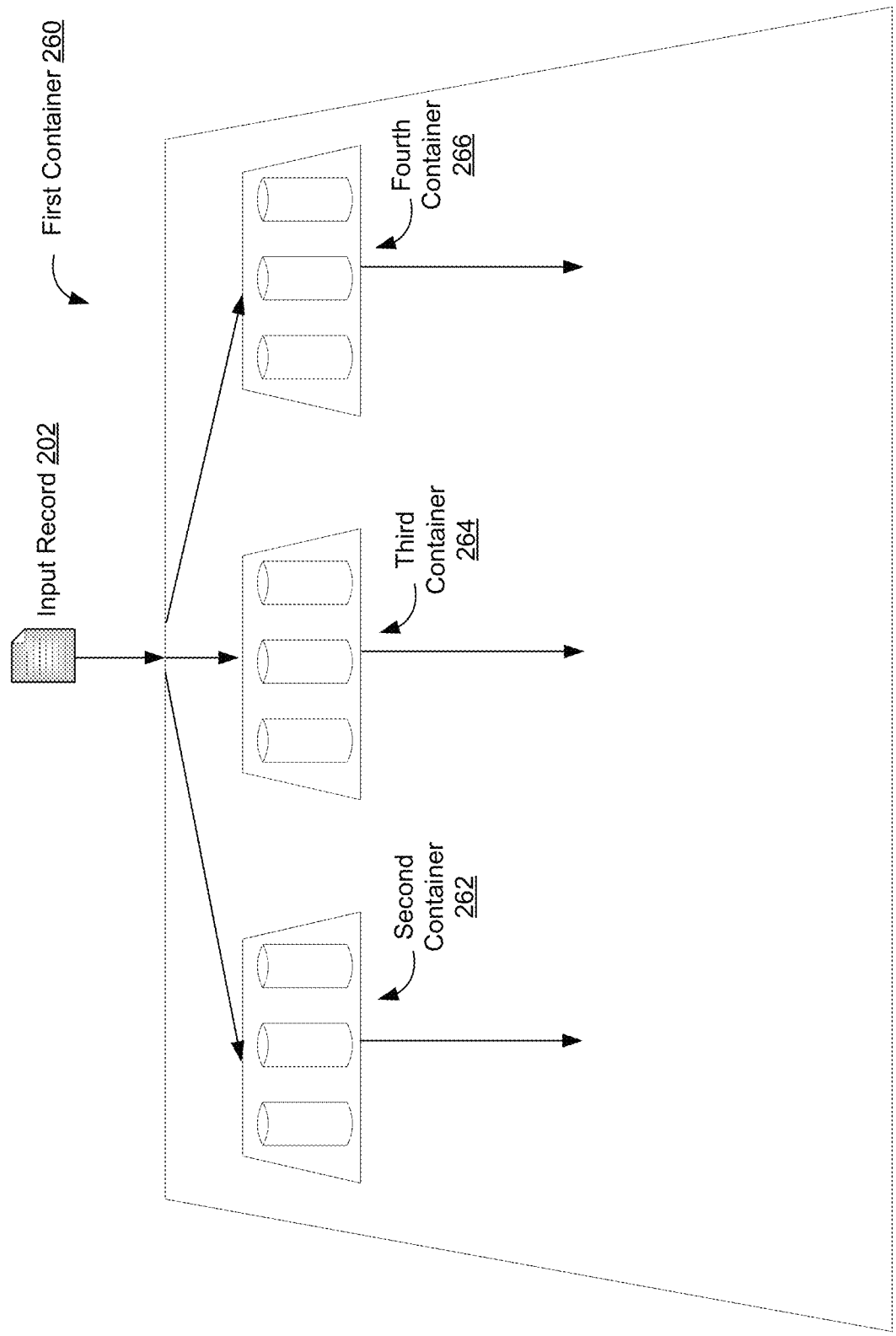
FIG. 2C illustrates non-limiting embodiments of a container of containers.

As noted above, containers may include other containers. That is, "inner" containers may be nested within "outer" containers. Some containers may even be "self-referential" in that a container may include a copy of itself, to generate recursive analyses. Containers of containers may be scaled both "horizontally" and "vertically," via nested containers. FIG. 2C illustrates non-limiting embodiments of a container of containers. FIG. 2C shows a first container 260 that receives the input record 202, as input. First container 260 is a container of containers. First container 260 includes a second container 262, a third container 264, and a fourth container 266. First container 260 has been scaled "horizontally" in that each of second container 262, third container 264, and fourth container 266 received input record 202 as an input. Each of second container 262, third container 264, and fourth container 266 may be specialized for different functions and/or classifications. Thus, each of second container 262, third container 264, and fourth container 266 may classify input record 202 separately and/or with different classes and/or types.

Although not shown in FIG. 2C, first container 260 may also be scaled "vertically," in that the outputs of the first horizontal layer (e.g., the input layer that includes second container 262, third container 264, and fourth container 266) may be employed as inputs to containers vertically below the input layer of containers. Relative terms such as "upstream" and "downstream" may be applied to characterize containers. For example, containers "closer" to the input of first container 260 may be said to be "upstream" from containers that are closer to an output of first container 260. The containers closer to the output of first container 260 may be said to be "downstream" from containers closer to the input of first container 260. Note that the containers within a container may be arranged to include feedback loops to other containers, iterative inputs to other containers, or containers feeding into themselves (e.g., recursive nesting of containers). Note that the "inner" nesting of containers may continue indefinitely. That is, a container may be a container of containers of containers, and such.

Figure 3:
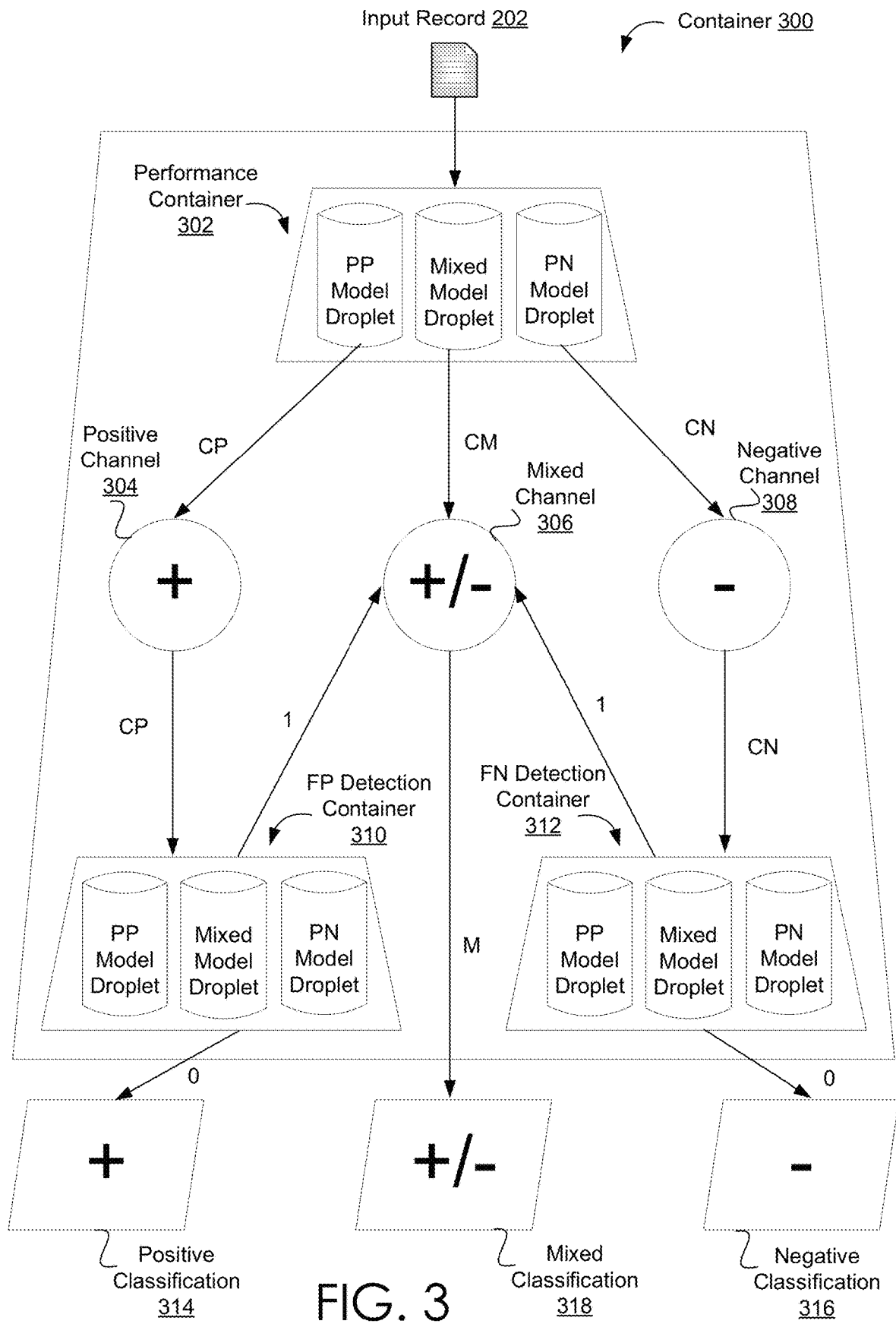
FIG. 3 illustrates another example of a container of containers that is consistent with the various embodiments.

FIG. 3 illustrates another example of a container of containers that is consistent with the various embodiments. FIG. 3 shows container 300, which receives input record 202 as an input. Container 300 is a container of containers and includes an upstream performance container 302 that classifies the input record 202. An integrated model included in performance container 302 includes a PP model droplet, a PN model droplet, and a mixed model droplet. The three model droplets of the integrated model of performance container 302 provide the initiation of three internal "channels" of container 300: a positive channel 304, a mixed channel 306, and a negative channel 308. If the performance container 302 classifies the input record 202 as being positive, then a "positive classification" signal (e.g., a CP signal that indicates "classification positive") is generated in the positive channel 304. If the performance container 302 classifies the input record 202 as being mixed (or uncertain), then a "mixed classification" signal (e.g., a CM or M signal that indicates "classification mixed") is generated in the mixed channel 306. If the performance container 302 classifies the input record 202 as being negative), then a "negative classification" signal (e.g., a CN signal that indicates "classification negative") is generated in the negative channel 308.

Container 300 includes two error-detection containers, false-positive (FP) detection container 310 and false-negative (FN) detection container 312, which are both downstream of the performance container 302. Thus, container 300 has been scaled vertically. Positive classification signals (e.g., CP) from the performance container 302 are routed to the FP detection container 310, via positive channel 304, to check if the positive classification may be a false-positive classification. Likewise, negative classification signals (e.g., CN) from the performance container 302 are routed to the FN detection container 312, via negative channel 308, to check if the negative classification may be a false-negative classification.

If the FP detection container 310 classifies the inputted positive classification signal (e.g., CP) as not being a FP classification, then the FP detection container 310 may send a signal (e.g., 0 to indicate that the classification is not a FP classification) to a positive classification output channel 314 of the container 300. If the FP detection container 310 classifies the inputted positive classification signal (e.g., CP) as being a FP classification, then the FP detection container 310 may send a signal (e.g., 1 to indicate that the classification is a FP classification) to the mixed channel 306 of container 300. Likewise, if the FN detection container 312 classifies the inputted negative classification signal (e.g., CN) as not being a FN classification, then the FN detection container 312 may send a signal (e.g., 0 to indicate that the classification is not a FN classification) to a negative classification output channel 316 of the container 300. If the FN detection container 312 classifies the inputted negative classification signal (CN) as being a FN classification, then the FN detection container 312 may send a signal (e.g., 1 to indicate that the classification is a FN classification) to the mixed channel 306 of container 300. The mixed channel 306 may send a mixed classification signal to a mixed classification output channel 318 of the container 300.

Figure 4:
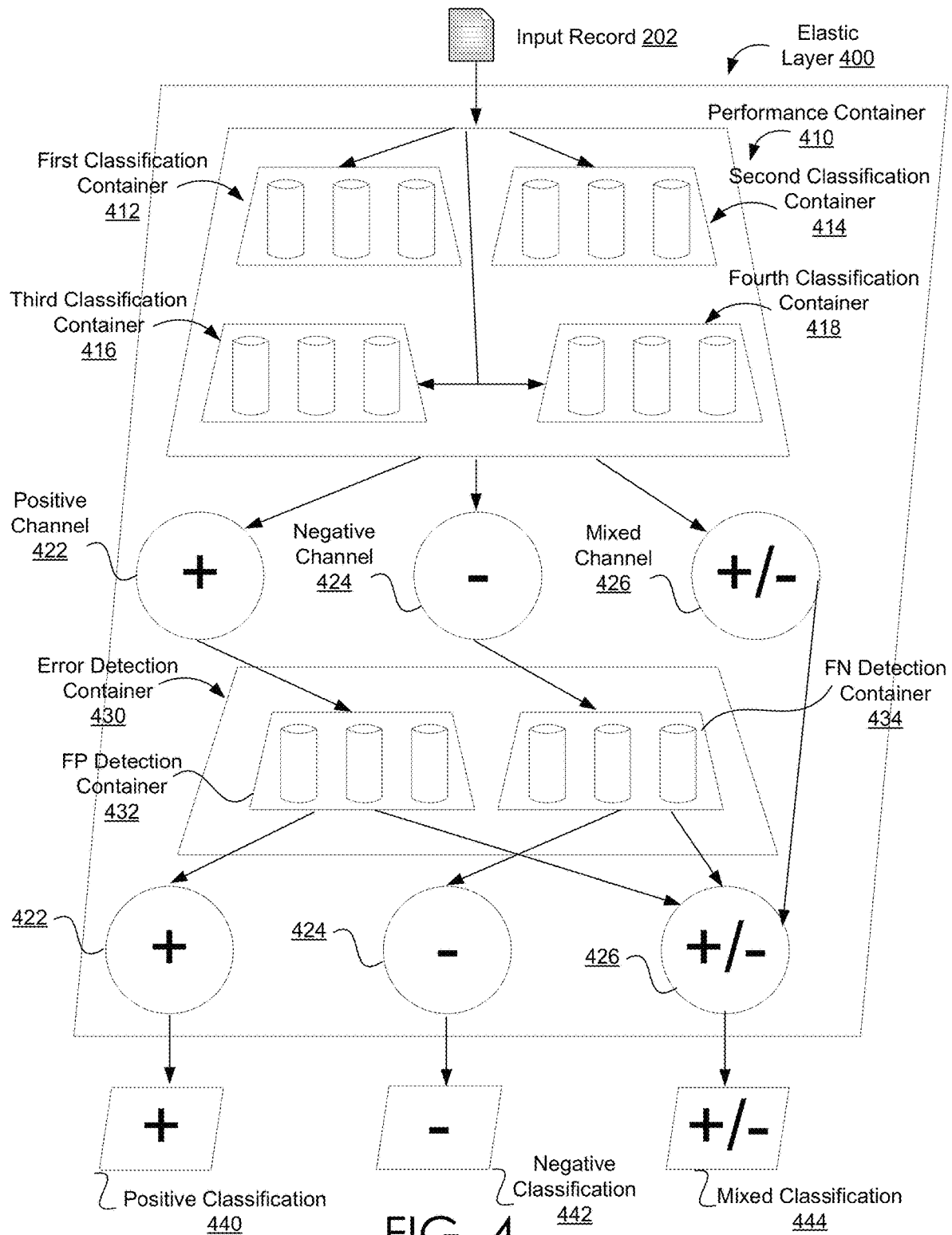
FIG. 4 illustrates an elastic layer that is consistent with the various embodiments.

At least one container may be embedded in a layer (e.g., an elastic layer). FIG. 4 illustrates an elastic layer 400 that is consistent with the various embodiments. Elastic layer 400 includes a performance container 410 and an error detection container 430. Performance container 410 includes a first classification container 412, a second classification container 414, a third classification container 416, and a fourth classification container 418. Error detection container 430 includes a false-positive (FP) detection container 432 and a false-negative (FN) detection container 434. Elastic layer 400 also includes an internal positive channel 422, an internal negative channel 424, and an internal mixed (or uncertain) channel 426. Elastic layer 400 may receive input record 202 as an input. Elastic layer 400 may include an output positive classification channel 440, an output negative classification channel 442, and an output mixed classification channel 444.

Each container included in the performance container 410 may be optimized for different levels of classification and/or classifying via separate classification types or categories. In the "offensive language" example discussed above, elastic layer 400 may be an "offensive language" layer. The first classification container 412 in the performance container 410 may be optimized for classifying a record as including (or not including) profanity. Thus, first classification container 412 may be a profanity classification container. The second classification container 414 in the performance container 410 may be optimized for classifying a record as including (or not including) harassing language. Thus, second classification container 414 may be a harassing language container. The third classification container 416 in the performance container 410 may be optimized for classifying a record as including (or not including) threatening language. Thus, third classification container 416 may be a threatening language container. The fourth classification container 418 in the performance container 410 may be optimized for classifying a record as including (or not including) hate-speech. Thus, the fourth classification container 418 may be a hate-speech container.

The scores and/or classifications of the first classification container 412, the second classification container 414, the third classification container 416, and the fourth classification container 418 may be combined in various ways. Based on the combination of the classifications, the performance container 410 may provide an outputted classification (for the input record 202) to the internal channels of layer 400. If combining the classifications results in a "positive" classification of input record 202, then performance container 410 provides a positive classification signal to the internal positive channel 422. If combining the classifications results in a "negative" classification of input record 202, then performance container 410 provides a negative classification signal to the internal negative channel 424. If combining the classifications results in a "mixed" (or uncertain) classification of input record 202, then performance container 410 provides a mixed (or uncertain) classification signal to the internal mixed (or uncertain) channel 426.

Positive and negative classification signals may be routed to the error detection container 430 by the internal positive classification channel 422 and the internal negative classification channel 424, respectively. More particularly, positive classification signals may be routed to the FP detection container 432 via the internal positive classification channel 422. Negative classification signals may be routed to the FN detection container 434 via the internal negative classification channel 424. Mixed classification channels may be routed from the internal mixed classification channel 426 to the output mixed classification channel 444. FP detection container 432 may be similar to FP detection container 310 of FIG. 3 and FN detection container 434 may be similar to FN detection container 312 of FIG. 3. Thus, the FP detection container 432 may detect FP classifications (within a stream of positive classifications of the performance container 410) and the FN detection container 434 may detect FN classifications (within a stream of negative classifications of the performance container 410). The FP detection container 432 may route detected FP classifications to the internal mixed channel 426 (downstream from the error detection container 430). The FN detection container 434 may also route detected FN classifications to the internal mixed channel 426 (downstream from the error detection container 430). The internal mixed channel 426 may route the FP and FN negative classifications to the output mixed classification channel 444.

The FP detection container 432 may route detected true positive (TP) classifications to the internal positive classification channel 422 (downstream from the error detection container 430). Likewise, the FN detection container 434 may route detected true negative (TN) classifications to the internal negative classification channel 424 (downstream from the error detection container 430). The internal positive channel 422 (downstream from the error detection container 430) may route TP classifications to the output positive classification channel 440. The internal negative channel 424 (downstream from the error detection container 430) may route TN classifications to the output negative classification channel 442.

Separate layers may be generated for separate droplet model types. For instance, some integrated models/containers may employ lexicon-based classifier droplets to analyze records at the level of keywords. Other integrated models/containers may employ lexicon-based classifier droplets to analyze records at the level of keyphrases and/or sentences. Still other integrated models/containers may employ transformer-based droplets to analyze records at the level of larger portions of content (e.g., at least one sentence, paragraph, section, chapter, or the like). In various non-limiting embodiments, a keyword layer, which includes at least one keyword-based container, may be generated. A keyphrase layer, which includes at least one keyphrase-based container, may be generated. A transformer layer, which includes at least one transformer-based container, may be generated.

Separate layers may be integrated to form a hierarchy of models. In a non-limiting embodiment directed towards the detection of offensive language, a hierarchy of models may include a keyword layer, a keyphrase model, and a transformer model. The various layers may form an "analysis chain" for analyzing a record. The layers may be combined in various ways to form feedback loops, recursive analyses, and/or iterative analyses to fully analyze a record. Similar to container/layer model structures, the output of a hierarchy model structure may include a first channel for positive classifications, a second channel for negative classifications, and a third channel for mixed (or uncertain classifications). In addition, similar to containers/layers, a hierarchy of models may include a single output channel with multiple output signal types.

FIG. 5 illustrates a hierarchy of models 500 that is consistent with the various embodiments. Hierarchy of models 500 is a non-limiting example of a hierarchy of models that includes at least one elastic layer of models. Hierarchy of models 500 includes a keyword layer 520, a keyphrase layer 530, and a transformer layer 540. Briefly, keyword layer 520 may be composed of model droplets, containers, and other layers (e.g., layers of layers) that are based on classifier model droplets that classify input records (e.g., input record 202) based on analyzing keywords in the input record. Keyphrase layer 530 may be composed of model droplets, containers, and other layers that are based on classifier model droplets that classify input records based on analyzing keyphrases in the input record. Transformer layer 540 may be composed of model droplets, containers, and other layers that are based on transformer-based model droplets that classify input records based on analyzing the input record via at least one transformer-based model.

The hierarchy of models 500 may be employed to monitor a system (e.g., system 100 of FIG. 1) for at least one compliance enforcement task. A pipeline of records (e.g., input pipeline 510, which includes input record 202) may be provided to the hierarchy of models 500. For each record that is positively classified (e.g., positively classified as including offensive language), at least one intervention may be applied to the record. For example, the record may be quarantined (or sandboxed) within the system, a warning and/or notification may be affixed to the record, or the like. Positively classified records may be provided to the intervention pipeline 550 so that the at least one intervention may be applied. For records that are negatively classified (e.g., negatively classified as not including offensive language), the records may be released to the system, e.g., the negatively classified records may be provided to a non-intervention pipeline 560.

Note that the connections between the various layers in the hierarchy of models 500 is shown for exemplary purposes only, and are non-limiting. The layers may be connected in various ways to provide feedback loops, iterative analyses of the input record 202, as well as recursive loops. For example, the output of a first layer may provide an input for the first layer or a second layer.

Methods for Generating Model Hierarchies and Compliance Enforcement

Figure 6A:
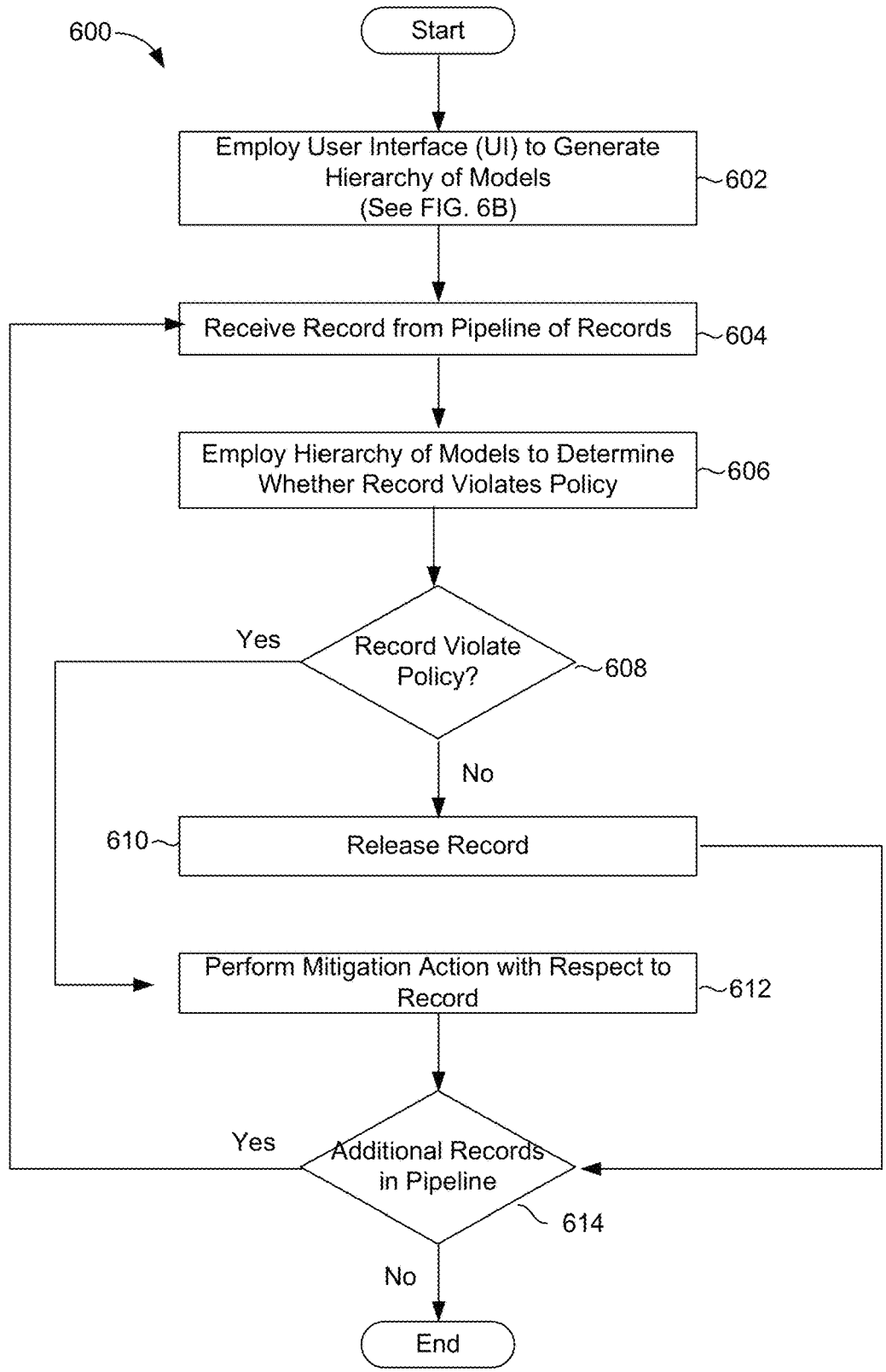
FIG. 6A shows a flow diagram that illustrates a method for enforcing compliance within a system, in accordance to the various embodiments.
Figure 6B:
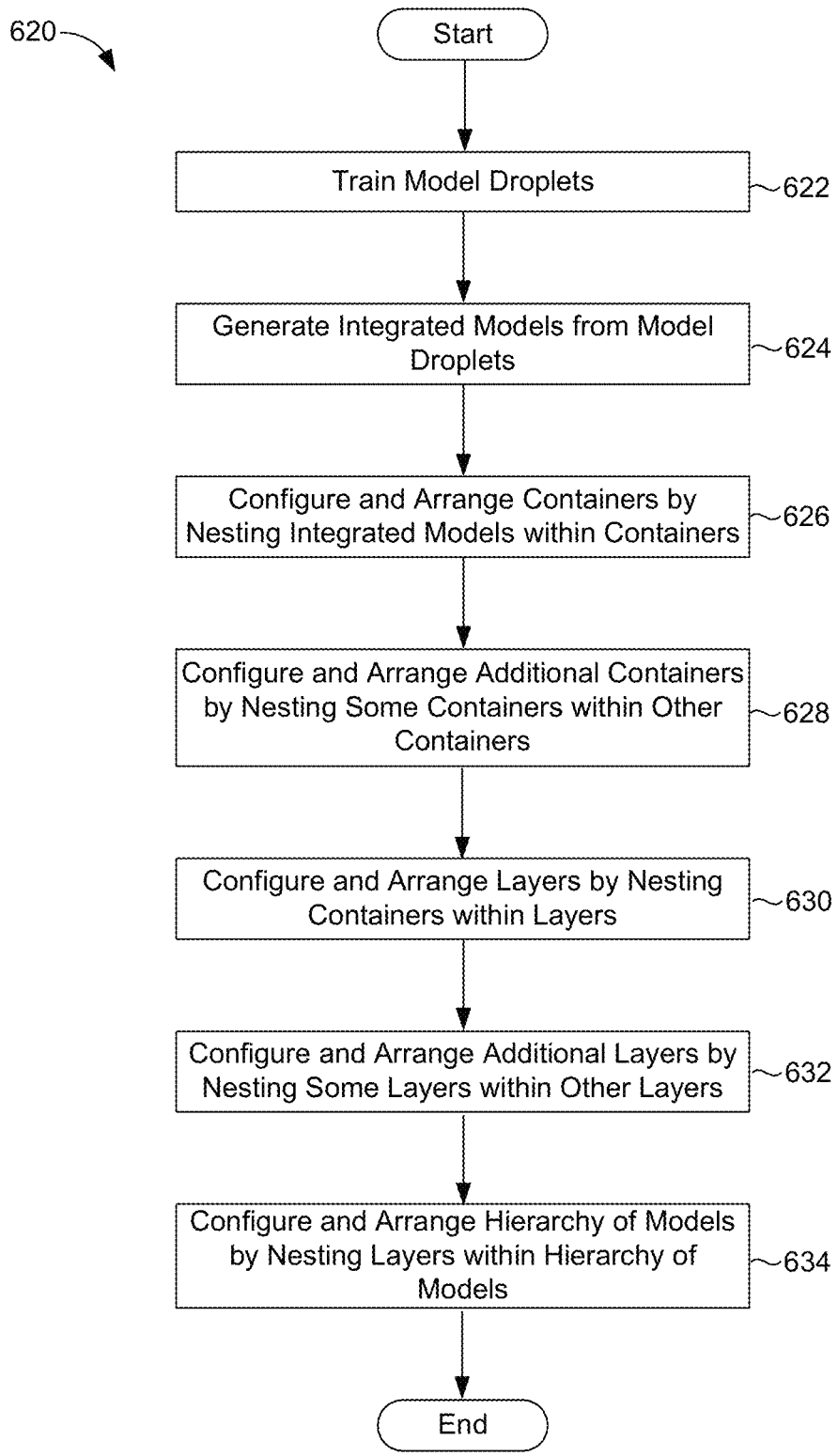
FIG. 6B shows a flow diagram that illustrates a method for generating a hierarchy of models, in accordance to the various embodiments.

With reference to FIGS. 6A-6B, flow diagrams are provided illustrating methods for generating model hierarchies and employing the model hierarchies for compliance enforcement, in accordance to the various embodiments. The methods may be performed using any of the embodiments described herein. For example, a hierarchy builder (e.g., hierarchy builder 140 of FIG. 1) may provide a user interface (UI) that enables a user to generate a hierarchy of models (e.g., hierarchy of models 150 of FIG. 1 and/or hierarchy of models 500 of FIG. 5). A compliance monitor (e.g., compliance monitor 120 of FIG. 1) may monitor records (e.g., communications, documents, files, and/or other content) within a communication and/or computational system (e.g., system 100 of FIG. 1). The compliance monitor may employ a record inspector (e.g., record inspector 130 of FIG. 1) to analyze the records and determine if a record violates at least one policy of the system. More specifically, the record inspector may employ the hierarchy of models to classify a record as violating a policy or not violating a policy. If a record violates a policy, the compliance monitor may perform at least one intervention and/or mitigation strategies with respect to the record.

Turning to FIG. 6A, a flow diagram is provided that illustrates a method 600 for enforcing compliance within a system, in accordance to the various embodiments. Generally, the flow diagram of FIG. 6A can be implemented using system 100 of FIG. 1 or any of the embodiments discussed throughout.

Initially, method 600 begins after a start block at block 602, where a user may employ a user interface (UI) to generate a hierarchy of models (e.g., hierarchy of models 150 of FIG. 1 or hierarchy of models 500 of FIG. 5). Various embodiments for generating a hierarchy of models are discussed in conjunction with method 620 of FIG. 6B. However, briefly here, a hierarchy builder (e.g., hierarchy builder 140 of FIG. 1) may provide the user interface.

At block 604, a record (e.g., input record 202 of FIG. 5) may be received from a pipeline of records (input pipeline 510 of FIG. 5). A compliance monitor (e.g., compliance monitor 120 of FIG. 1) may receive the record. The record may encode content. At block 606, the hierarchy of models may be employed to analyze the record. More specifically, a record inspector (e.g., record inspector 130 of FIG. 1) may employ the hierarchy of models to determine whether or not the record and/or the encoded content violates at least one policy of the system (e.g., a record may violate an offensive language policy if the encoded content includes offensive language (e.g., profanity, threatening language, hate-speech, or the like)). At decision block 608, if the record and/or encoded content violates at least one policy, then method 600 may flow to block 612. Otherwise, if the record and/or content does not violate at least one policy, method 600 may flow to block 610.

At block 610, the record that does not violate at least one policy may be released to the system. For example, the non-violating record may be released to a non-intervention pipeline of the system (e.g., non-intervention pipeline 560 of FIG. 5). Method 600 may then flow to decision block 614. At block 612, at least one mitigation and/or intervention action may be performed. For example, the compliance monitor may perform an intervention and/or mitigation. In some embodiments, the record that violates at least one policy may be placed in an intervention pipeline (e.g., intervention pipeline 550 of FIG. 5). Method 600 may then flow to decision block 614. At decision block 614, it is determined whether the pipeline of records (e.g., input pipeline 510 of FIG. 5) includes any additional record to be analyzed. If additional records are in the input pipeline, the method 600 may return to block 604 to receive the next record in the pipeline. Otherwise, if the pipeline of records is devoid of additional records, then method 600 may terminate. Note that method 600 may be performed in a real-time mode or in a batch mode.

Turning to FIG. 6B, a flow diagram is provided that illustrates a method 620 for generating a hierarchy of models, in accordance to the various embodiments. Generally, the flow diagram of FIG. 6B can be implemented using system 100 of FIG. 1 or any of the embodiments discussed throughout.

Initially, method 620 begins after a start block at block 622, where a plurality of model droplets are trained. The model droplets may include lexicon-based classifier models, such as, but not limited to, the model droplets discussed in conjunction with at least FIG. 2A. At block 624, a plurality of integrated models may be generated by integrating various model droplets. At block 626, a plurality of container model structures may be configured and arranged by nesting (or embedding) integrated models within the containers. The containers may include containers discussed in conjunction with any of FIGS. 2B, 2C, 3, 4, and 5. At block 628, additional container model structures may be configured and arranged by nesting (or embedding) some of the containers in other containers. That is, at least one container of container model structure may be generated. Such container of container structures are discussed at least in conjunction with FIGS. 3, 4, and 5.

At block 630, a plurality of elastic layers may be configured and arranged by nesting (or embedding) containers within the layers. Various embodiments of elastic layers are discussed in conjunction with at least FIGS. 4 and 5. At block 632 additional elastic layers may be configured and arranged by nesting (or embedding) some of the layers within other layers. That is, layers of layers may be generated at block 632. At block 634, a hierarchy of models may be configured and arranged by nesting (or embedding) the layers within a hierarchy. A non-limiting example of a hierarchy of models is discussed in conjunction with at least FIG. 5.

OTHER EMBODIMENTS

One embodiment includes receiving a digital record that encodes content. A plurality of models (e.g., integrated models and/or model droplets) may be employed to analyze the record. The plurality of models may be configured and arranged within a nested structure of a hierarchy of models. Each of the plurality of models may analyze at least a portion of the record. Based on the nested structure, the hierarchy may combine the analysis from each of the plurality of models to determine that the content violates a policy of a system. In response to determining that the content violates the policy, at least one mitigation (or intervention) action may be performed. The at least one mitigation action may alter subsequent transmissions of the record.

Advantageously, these and other embodiments, as described herein improve existing computing technologies by providing more efficient means of computation when employing models to ensure the enforcement of system policies, as described throughout. The embodiments provide various benefits over conventional approaches to ensure the enforcement of at least one policy of a computational and/or communication system. Due to the complexity of ensuring enforcement of a given policy, no single model is likely able to accurately classify records as violating (or not violating) the policy. Any given policy likely encompasses many domains, of which no single model is likely to model accurately or encompass fully. The various embodiments overcome such limitations of conventional approaches by combining and providing feedback between multiple models. Each model of the embodiments may be trained to address various aspects (or domains) of a given policy. The at least one domain of a given model may be separate from other domains of other models or at least partially overlap the domains of at least one other model.

Furthermore, the models are arranged in a hierarchy of model droplets, containers, and layers. The various models, containers, and layers of the embodiments are enabled to "talk" to one another via having outputs of some components tied to the inputs of other components. Furthermore, the embodiments enable feedback loops between the various components (model droplets, containers, layers, and hierarchies). As noted above, the models of the embodiments may be trained to have "overlapping" portions of their respective domains, such that the "overlapping" models provide a system of "checks and balances" between competing models. The "overlap" between two or models provides more accurate results than conventional models.

Additionally, the conventional approaches that employ conventional machine learning (ML) models are often non-transparent to a developer and the users of the models. Conventional ML models, especially those based on neural-network architectures, are frequently opaque in that the "logic" of their operations are not readily inferable based on the set of weights that comprise the model. In contrast, the logic behind the various embodiments is inferable by the arrangement of the hierarchy of models. Furthermore, conventional approaches often do not control for errors in classifications. As discussed throughout, the embodiments provide the benefit of employing various error detection (and correction) components. These error detection (and correction) components are enabled to detect (and correct) false-positive (FP) errors and false-negative (FN) errors. Importantly, the embodiments provide scalability as an enforcement task scales. Conventional approaches may not readily scale as the complexity of the task grows. In contrast, the embodiments provide scalability by enabling scaling of the nested structure of the hierarchy of models In the above embodiment, the plurality of models may include an integrated classifier model. The integrated classifier model may include a first classifier model based on a first lexicon, a second classifier model based on a second lexicon, and a third classifier model based on a third lexicon. The first lexicon may include a first plurality of strings. The first plurality of strings may be included in a first plurality of training records that are labeled as belonging to the positive class of the integrated classifier model. The second lexicon includes a second plurality of strings. The second plurality of strings may be included in a second plurality of training records that are labeled as belonging to a negative class of the integrated classifier model. The third lexicon may include a third plurality of strings. The third plurality of strings may be included in both the first plurality of training records and the second plurality of training records.

In any of the above embodiments, the at least one mitigation action may include at least one of providing a warning indicating that the content violates the policy, deleting at least a portion of the content from the record, replacing the deleted portion of the content, or quarantining the record from the system.

In any of the above embodiments, the nested structure may include each of the plurality of models being nested within at least one container object (or structure) of a plurality of container objects included in the hierarchy. The plurality of containers may include a false-positive (FP) detection container. The FP detection container may include a first model of the plurality of models. The plurality of containers may also include a false-negative (FN) detection container. The FN detection container may include a second model of the plurality of models. The FP detection container may be enabled to detect FP classifications. The FN detection container may be enabled to detect FN classifications. In at least one embodiment, the nested structure may further include each of the plurality of containers being nested within at least one layer of a plurality of layers included in the hierarchy.

In any of the above embodiments, the plurality of models may include a first lexicon-based classifier model, a second lexicon-based classifier model, and a third transformer-based classifier model. The plurality of containers may include a first container, a second container, and a third container. The plurality of layers may include a first layer, a second layer, and a third layer. The first lexicon-based classifier model may be nested (or embedded) within the first container. The first container may be nested (or embedded) within the first layer. The second lexicon-based classifier model may be nested (or embedded) within the second container. The second container may be nested (or embedded) within the second layer. The third transformer-based classifier model may be nested (or embedded) within the third container. The third container may be nested (or embedded) within the third layer. The first lexicon-based model may be enabled to classify the record as at least one class of a plurality of classes based on a keyword included in the content. The second lexicon-based model may be enabled to classify the record as at least one class of the plurality of classes based on a keyphrase included in the content. The third transformer-based model may be enabled to classify the record as at least one class of the plurality of classes based on a plurality of sentences included in the content.

In another embodiment, a digital record that encodes content is received. It may be determined that the content violates a policy of the system. The determination that the policy violates the policy may be based on an analysis of the record by each of a plurality of models. The models may be are arranged in a nested structure within a hierarchy that combines the analysis from each of the plurality of models to determine that the content violates the policy. A mitigation action may be performed in response to the determination that the content violates the policy.

Generalized Computing Device

Figure 7:
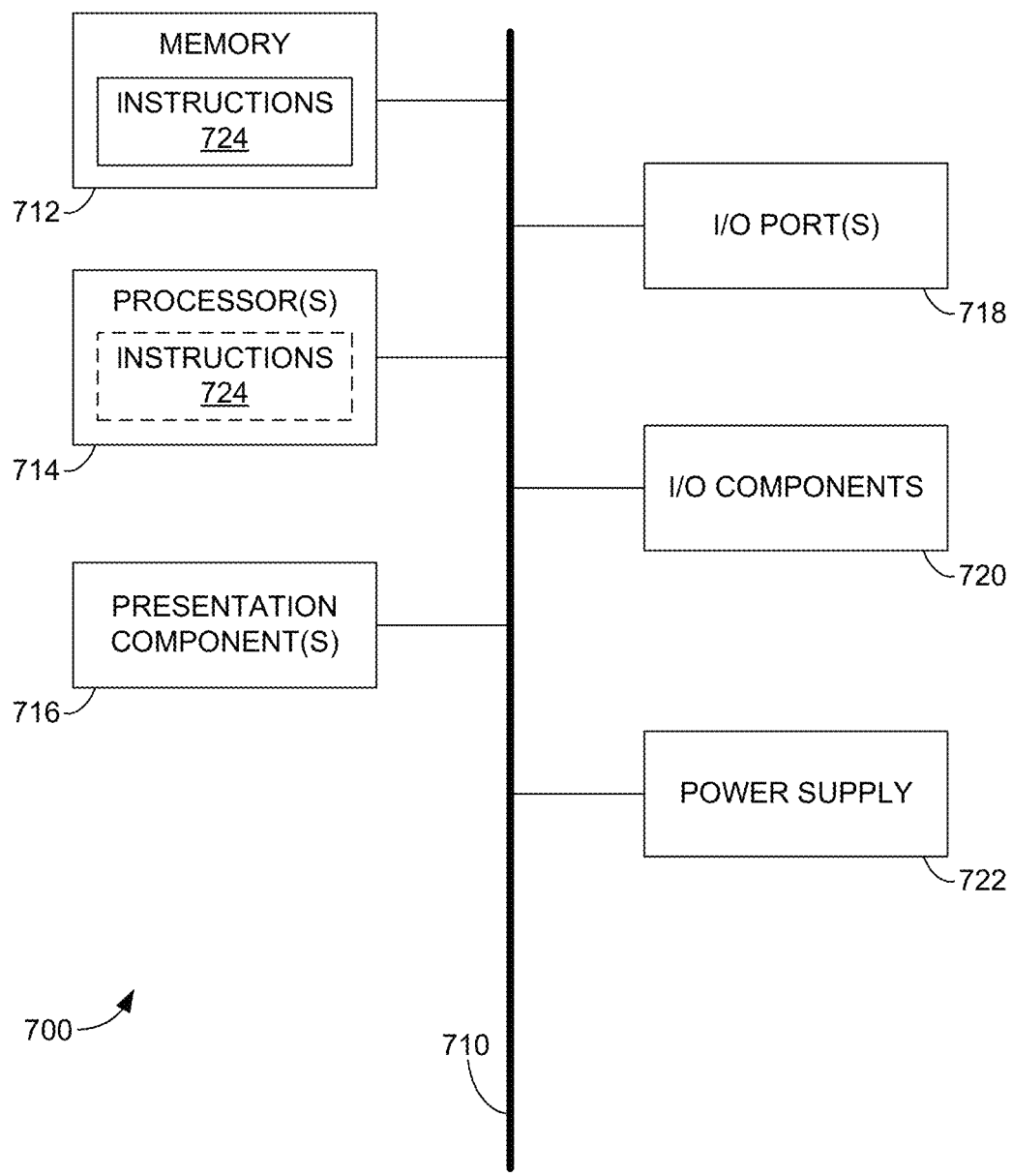
FIG. 7 is a block diagram of an exemplary computing environment suitable for use in implementing aspects of the technology described herein.

With reference to FIG. 7, computing device 700 includes a bus 710 that directly or indirectly couples the following devices: memory 712, at least one processor 714, at least one presentation component 716, at least one input/output (I/O) port 718, at least one I/O component 720, and an illustrative power supply 722. Bus 710 represents what may be at least one buss (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with at least one embodiment of the present disclosure. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has at least one of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes at least one processor 714 that read data from various entities such as memory 712 or I/O components 720. Presentation component(s) 716 presents data indications to a user or other device.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include at least one radio (or similar wireless communication components), which is not explicitly shown in FIG. 7. The radio transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, at least one of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low-level software written in machine code, higher level software such as application software and any combination thereof. In this regard, the system components can manage resources and provide services for system functionality. Any other variations and combinations thereof are contemplated within embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by at least one entity may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with at least one of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where at least one feature is present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed:

1. A computer-implemented method for compliance enforcement, the method comprising:
    receiving a digital record that encodes content;
    determining that the content violates a policy of the system based on an analysis of the record by each of a plurality of models that are arranged in a nested structure within a hierarchy that combines the analysis from each of the plurality of models, wherein a first lexicon-based classifier model of the plurality of models is nested within a first layer of a plurality of layers included in the hierarchy, a second lexicon-based classifier model of the plurality of models is nested within a second layer of the plurality of layers, and a third transformer-based classifier model of the plurality of models is nested within a third layer of the plurality of layers, and wherein the first lexicon-based model classifies the record as at least one class of a plurality of classes based on a keyword included in the content, the second lexicon-based model classifies the record as at least one class of the plurality of classes based on a keyphrase included in the content, and the third transformer-based model classifies the record as at least one class of the plurality of classes based on a plurality of sentences included in the content; and in response to determining that the content violates the policy, performing at least one mitigation action that alters subsequent transmissions of the record.

2. The method of claim 1, wherein the plurality of models includes an integrated classifier model that includes a first classifier model based on a first lexicon, a second classifier model based on a second lexicon, and a third classifier model based on a third lexicon, and wherein the first lexicon includes a first plurality of strings that are included in a first plurality of training records that are labeled as belonging to the positive class of the integrated classifier model, the second lexicon includes a second plurality of strings that are included in a second plurality of training records that are labeled as belonging to a negative class of the integrated classifier model, and the third lexicon includes a third plurality of strings that are included in both the first plurality of training records and the second plurality of training records.

3. The method of claim 1, wherein the at least one mitigation action includes at least one of providing a warning indicating that the content violates the policy, deleting at least a portion of the content from the record, replacing the deleted portion of the content, or quarantining the record from the system.

4. The method of claim 1, wherein the nested structure includes each of the plurality of models being nested within at least one container of a plurality of container objects included in the hierarchy.

5. The method of claim 4, wherein the plurality of containers includes a false-positive (FP) detection container that includes a first model of the plurality of models and a false-negative (FN) detection container that includes a second model of the plurality of models, and wherein the FP detection container detects FP classifications and the FN detection container detects FN classifications.

6. The method of claim 4, wherein the nested structure further includes each of the plurality of containers being nested within at least one layer of a plurality of layers included in the hierarchy.

7. A system for generating an integrated classifier model that has a positive class and a negative class, the system comprising:

at least one hardware processor; and at least one computer-readable media having executable instructions embodied thereon, which, when executed by the at least one processor, cause the at least one hardware processor to execute actions comprising:

receiving a digital record that encodes content;

determining that the content violates a policy of the system based on an analysis of the record by each of a plurality of models that are arranged in a nested structure within a hierarchy that combines the analysis from each of the plurality of models, wherein a first lexicon-based classifier model of the plurality of models is nested within a first layer of a plurality of layers, a second lexicon-based classifier model of the plurality of models is nested within a second layer of the plurality of layers, and a third transformer-based classifier model of the plurality of models is nested within a third layer of the plurality of layers, and wherein; and in response to determining that the content violates the policy, performing at least one mitigation action that alters subsequent transmissions of the record.

8. The system of claim 7, wherein the plurality of models includes an integrated classifier model that includes a first classifier model based on a first lexicon, a second classifier model based on a second lexicon, and a third classifier model based on a third lexicon, and wherein the first lexicon includes a first plurality of strings that are included in a first plurality of training records that are labeled as belonging to the positive class of the integrated classifier model, the second lexicon includes a second plurality of strings that are included in a second plurality of training records that are labeled as belonging to a negative class of the integrated classifier model, and the third lexicon includes a third plurality of strings that are included in both the first plurality of training records and the second plurality of training records.

9. The system of claim 7, wherein the at least one mitigation action includes at least one of providing a warning indicating that the content violates the policy, deleting at least a portion of the content from the record, replacing the deleted portion of the content, or quarantining the record from the system.

10. The system of claim 7, wherein the nested structure includes each of the plurality of models being nested within at least one container of a plurality of container objects included in the hierarchy.

11. The system of claim 10, wherein the plurality of containers includes a false-positive (FP) detection container that includes a first model of the plurality of models and a false negative (FN) detection container that includes a second model of the plurality of models, and wherein the FP detection container detects FP classifications and the FN detection container detects FN classifications.

12. The system of claim 10, wherein the nested structure further includes each of the plurality of containers being nested within at least one layer of a plurality of layers included in the hierarchy.

13. At least one computer storage media storing computer-useable instructions that, when used by at least one computing device including a processor and memory, cause the at least one computing device to perform actions comprising:

receiving a digital record that encodes content;

determining that the content violates a policy of the system based on an analysis of the record by each of a plurality of models that are arranged in a nested structure within a hierarchy that combines the analysis from each of the plurality of models, wherein the plurality of models includes a first classifier model based on a first lexicon, a second classifier model based on a second lexicon, and a third classifier model based on a third lexicon, and wherein the first lexicon includes a first plurality of strings of the record that are labeled as belonging to a positive class associated with the plurality of models, the second lexicon includes a second plurality of strings of the record that are labeled as belonging to a negative class associated with the plurality of models, and the third lexicon includes a third plurality of strings of the record that are included in both the first plurality of strings and the second plurality of strings; and in response to determining that the content violates the policy, performing at least one mitigation action that alters subsequent transmissions of the record.

14. The media of claim 13, wherein the plurality of models includes an integrated classifier model that includes a first classifier model based on a first lexicon, a second classifier model based on a second lexicon, and a third classifier model based on a third lexicon, and wherein the first lexicon includes a first plurality of strings that are included in a first plurality of training records that are labeled as belonging to the positive class of the integrated classifier model, the second lexicon includes a second plurality of strings that are included in a second plurality of training records that are labeled as belonging to a negative class of the integrated classifier model, and the third lexicon includes a third plurality of strings that are included in both the first plurality of training records and the second plurality of training records.

15. The media of claim 13, wherein the nested structure includes each of the plurality of models being nested within at least one container of a plurality of container objects included in the hierarchy.

16. The media of claim 15, wherein the plurality of containers includes a false-positive (FP) detection container that includes a first model of the plurality of models and a false-negative (FN) detection container that includes a second model of the plurality of models, and wherein the FP detection container detects FP classifications and the FN detection container detects FN classifications.

17. The media of claim 15, wherein the nested structure further includes each of the plurality of containers being nested within at least one layer of a plurality of layers included in the hierarchy.

18. The system of claim 12, wherein the first lexicon-based model classifies the record as at least one class of a plurality of classes based on a keyword included in the content, the second lexicon-based model classifies the record as at least one class of the plurality of classes based on a keyphrase included in the content, and the third transformer-based model classifies the record as at least one class of the plurality of classes based on a plurality of sentences included in the content.

19. The method of claim 1, wherein the first lexicon includes a first plurality of strings of the record that are labeled as belonging to a positive class associated with the plurality of models, the second lexicon includes a second plurality of strings of the record that are labeled as belonging to a negative class associated with the plurality of models, and the third lexicon includes a third plurality of strings of the record that are included in both the first plurality of strings and the second plurality of strings.

20. The system of claim 13, wherein the first lexicon-based model classifies the record as at least one class of a plurality of classes based on a keyword included in the content, the second lexicon-based model classifies the record as at least one class of the plurality of classes based on a keyphrase included in the content, and the third transformer-based model classifies the record as at least one class of the plurality of classes based on a plurality of sentences included in the content.

* * * * *